(12) United States Patent
Hayashi

(10) Patent No.: US 8,406,595 B2
(45) Date of Patent: Mar. 26, 2013

(54) MULTI-CORE FIBER

(75) Inventor: Tetsuya Hayashi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 245 days.

(21) Appl. No.: 13/011,193

(22) Filed: Jan. 21, 2011

(65) Prior Publication Data

US 2011/0182557 A1 Jul. 28, 2011

Related U.S. Application Data

(60) Provisional application No. 61/298,073, filed on Jan. 25, 2010.

(30) Foreign Application Priority Data

Jan. 22, 2010 (JP) ................................ P2010-012150

(51) Int. Cl.
*G02B 6/036* (2006.01)
(52) U.S. Cl. ........................................ 385/126; 385/123
(58) Field of Classification Search ........... 385/123–128
See application file for complete search history.

(56) References Cited

U.S. PATENT DOCUMENTS

| | | | |
|---|---|---|---|
| 7,920,767 B2* | 4/2011 | Fini | 385/123 |
| 2011/0129190 A1* | 6/2011 | Fini et al. | 385/126 |

OTHER PUBLICATIONS

Koshiba, M., et al., "Heterogeneous multi-core fibers: proposal and design principle", IEICE Electronics Express, 2009, pp. 98-103, vol. 6 No. 2.
Yabu, T., "Introduction to Optical Waveguide Analysis", 2007, pp. 58-63, Morikita Publishing Co., Ltd.
Imamura, K., et al., "Investigation on Multi-Core Fibers with Large Aeff and Low Micro Bending Loss", OSA/OFC/NFOEC 2010.

* cited by examiner

*Primary Examiner* — Kevin S Wood
(74) *Attorney, Agent, or Firm* — McDermott Will & Emery LLP

(57) ABSTRACT

The present invention relates to a multi-core fiber having a structure for effectively suppressing crosstalk increase between cores caused by bending within an allowable range. The multi-core fiber comprises a plurality of types of cores respectively extending along an optical axis and a cladding region, and the effective refractive index of each core is set so that, in all pairs of cores of different types, a relative refractive index difference between an effective refractive index of a core of a certain type and an effective refractive index of a core of another type satisfies a condition regulated according to a core spacing between cores and a bending radius.

17 Claims, 9 Drawing Sheets

| X[μm] \ R[mm] | 200 | 150 | 140 | 115 | 100 | 85 | 76 | 60 | 30 | 10 |
|---|---|---|---|---|---|---|---|---|---|---|
| -60 | -0.030 | -0.040 | -0.043 | -0.052 | -0.060 | -0.071 | -0.079 | -0.100 | -0.201 | -0.605 |
| -50 | -0.025 | -0.033 | -0.036 | -0.044 | -0.050 | -0.059 | -0.066 | -0.083 | -0.167 | -0.504 |
| -40 | -0.020 | -0.027 | -0.029 | -0.035 | -0.040 | -0.047 | -0.053 | -0.067 | -0.134 | -0.402 |
| -30 | -0.015 | -0.020 | -0.021 | -0.026 | -0.030 | -0.035 | -0.039 | -0.050 | -0.100 | -0.301 |
| -20 | -0.010 | -0.013 | -0.014 | -0.017 | -0.020 | -0.024 | -0.026 | -0.033 | -0.067 | -0.201 |
| -10 | -0.005 | -0.007 | -0.007 | -0.009 | -0.010 | -0.012 | -0.013 | -0.017 | -0.033 | -0.100 |
| 0 | 0.000 | 0.000 | 0.000 | 0.000 | 0.000 | 0.000 | 0.000 | 0.000 | 0.000 | 0.000 |
| 10 | 0.005 | 0.007 | 0.007 | 0.009 | 0.010 | 0.012 | 0.013 | 0.017 | 0.033 | 0.100 |
| 20 | 0.010 | 0.013 | 0.014 | 0.017 | 0.020 | 0.024 | 0.026 | 0.033 | 0.067 | 0.199 |
| 25 | 0.012 | 0.017 | 0.018 | 0.022 | 0.025 | 0.029 | 0.033 | 0.042 | 0.083 | 0.249 |
| 30 | 0.015 | 0.020 | 0.021 | 0.026 | 0.030 | 0.035 | 0.039 | 0.050 | 0.100 | 0.299 |
| 40 | 0.020 | 0.027 | 0.029 | 0.035 | 0.040 | 0.047 | 0.053 | 0.067 | 0.133 | 0.398 |
| 50 | 0.025 | 0.033 | 0.036 | 0.043 | 0.050 | 0.059 | 0.066 | 0.083 | 0.166 | 0.496 |
| 60 | 0.030 | 0.040 | 0.043 | 0.052 | 0.060 | 0.071 | 0.079 | 0.100 | 0.199 | 0.595 |

(UNITE:%)

MULTI-CORE FIBER

CROSS-REFERENCE TO RELATED APPLICATION

This application claims priority to Provisional Application No. 61/298,073 filed on Jan. 25, 2010 by the same Applicant, which is hereby incorporated by reference in its entirety.

BACKGROUND OF THE INVENTION

1. Field of the Invention

The present invention relates to a multi-core fiber having a plurality of cores respectively extending along a predetermined axis.

2. Related Background Art

Multi-core fibers, constituted so as to integrally surround a plurality of cores with a cladding region in order to realize higher capacity in optical transmission, are known.

For example, in a multi-core fiber described in IEICE Electronics Express, Vol. 6, No. 2, pp. 98-103 (Document 1), when the center-to-center spacing of the cores is 30 μm, concerning the power transfer ratio between cores adjacent to each other, sufficiently small crosstalk can be realized by changing the difference in relative refractive index difference Δ (hereinafter, referred to as core Δ) of a core from a cladding between cores adjacent to each other to be slight (for example, 0.005%). By this, a multi-core fiber with a cladding diameter of 125 μm having three types of cores with different core Δ can be realized. However, bending of the fiber is not considered in Document 1. In the result of fabricating a multi-core fiber in accordance with Document 1, it was reported that the theretical value and the measured value of crosstalk remarkably differ from each other, and it was considered that this matter was caused by a core diameter whose size is off from a designed size. However, an effect due to bending was not considered.

SUMMARY OF THE INVENTION

The present inventor considered an effect of bending is largely related to the condition that the measured value and the theoretical value of crosstalk in a multi-core fiber remarkably differ from each other, and then studied such a consideration. As a result, it turned out that the effect of bending is largely related to the difference between the theoretical value and the measured value. Even though an optical fiber is designed without considering a bending, namely so as to cause no problem with crosstalk in a straight condition, the present inventor discovered that there was a problem with crosstalk in a bent condition. In general, optical characteristics of an optical fiber are measured while wounding it on a bobbin, and as a result a quality thereof is ensured. In the multi-core fiber designed without considering a bending, it was discovered that a crosstalk, having a level that there is a problem with transmission and measurement for optical characteristics of each core, is caused by a bending of the multi-core fiber wounded on the bobbin. The present inventor has arrived at a conclusion that a conventional multi-core fiber should be designed such that there is no problem with crosstalk even when it is bent.

The present invention has been developed to eliminate the problems described above. It is an object of the present invention to provide a multi-core fiber having a structure for suppressing a problem with crosstalk between cores in a condition that a multi-core fiber is added with bent condition within an allowable range. In this specification, "bent state within an allowable range" means a state where the fiber is wound around a bobbin, etc., and does not mean how far a partially-very-short optical fiber is allowed to be bent.

In order to solve the above-described problem, a multi-core fiber according to the present invention comprises a plurality of types of cores which respectively extend along a predetermined axis and have different effective refractive indexes in design, and a cladding region which integrally surround the plurality of types of cores.

Generally, in a waveguide bent at a predetermined curvature, around a reference core, at a core positioned on the outer side of the bend, the optical path length becomes longer, and on the other hand, at a core positioned on the inner side of the bend, the optical path length becomes shorter (physically, the distance increases or decreases). Therefore, an equivalent refractive index converted in terms of a linear waveguide must be considered. In detail, upon considering the fluctuation of the equivalent refractive index caused by bending, the relative refractive index difference between effective refractive indexes of cores must be set. The equivalent refractive index is described in detail in Tetsuro Yabu "Introduction to Optical Waveguide Analysis," 2007, published by Morikita Publishing Co., Ltd., pp. 58-63 (Document 2), etc., and simply speaking, in order to handle the optical fiber as a linear waveguide, upon assuming that the refractive index is not actually changed by bending, the equivalent refractive index expresses an optical path length difference caused by bending as a refractive index difference.

In the multi-core fiber according to the present invention, each of the plurality of core is arranged such that a minimum core spacing $D_{min}$ between the same type of cores, serving as a center-to-center spacing of cores, becomes not shorter than the minimum spacing that causes no problem with crosstalk. The multi-core fiber has at least a pair of cores of different types with the core spacing shorter than $D_{min}$. Particular, in the multi-core fiber, when, in all pairs of cores with the core spacings shorter than $D_{min}$, a core spacing and the bending radius in the cross-section of the multi-core fiber are respectively defined as D and R, a relative refractive index difference $\Delta_{\mathit{eff}}$ between an effective refractive index of the core of a certain type and an effective refractive index of the core of the other type satisfies the condition expressed by the following expression (1):

$$\Delta_{\mathit{eff}}(\%) > \frac{2\frac{D}{R} + \left(\frac{D}{R}\right)^2}{2\left(1 + \frac{D}{R}\right)^2} \cdot 100 \qquad (1)$$

In the multi-core fiber according to the present invention, when a difference of equivalent refractive index of effective refractive index between cores of the different types falls within a range that causes a problem with crosstalk, the relative refractive index difference $\Delta_{\mathit{eff}}$ between effective refractive indexes of the core of the certain type and the core of the other type with the core spacing shorter than $D_{min}$ preferably satisfy the following expression (2).

$$\Delta_{\mathit{eff}}(\%) \geq \frac{2\frac{D}{R} + \left(\frac{D}{R}\right)^2}{2\left(1 + \frac{D}{R}\right)^2} \cdot 100 + 0.005 \qquad (2)$$

The multi-core fiber according to the present invention is preferably wound around a bobbin with a body radius of R. In this case, if the multi-core fiber is wound in shipping, a client buying it can verify whether there is a problem with crosstalk and characteristics of each core or not while the multi-core finer is wound around the bobbin.

In the multi-core fiber according to the present invention, the body radius R of the bobbin preferably fall within the range of 200 mm to 30 mm. Since crosstalk due to the equivalent refractive index $\Delta_{eq}$ becomes pronounced in the condition that the body radius R of the bobbin is 200 mm or less, the multi-core fiber according to the present invention is effective. On the other hand, in the condition that the body radius R of the bobbin is 30 mm or less, design and fabrication for the multi-core fiber itself become difficult. The body radius R of the bobbin may fall within the range of 150 mm to 30 mm. The body radius R of the bobbin may fall within the range of 100 mm to 30 mm. More specifically, it is preferable that the body radius R of the bobbin is one of 76 mm, 85 mm, 115 mm, and 140 mm.

More specifically, in the multi-core fiber according to the present invention, at least a part of the multi-core fiber is bent at a radius R of not greater than 200 mm, and when, in all pairs of cores of different types with the core spacings shorter than $D_{min}$, the core spacing in a cross-section of the multi-core fiber orthogonal to the predetermined axis is defined as D, the relative refractive index difference $\Delta_{eff}$ between effective refractive indexes of the core of a certain type and the core of the other type preferably satisfy the following expression (3).

$$\Delta_{eff}(\%) > \frac{50(400 + D)D}{(200 + D)^2} \quad (3)$$

In the multi-core fiber according to the present invention, when, in all pairs of cores of different types with the core spacings shorter than $D_{min}$, the bending radius R is 150 mm, the relative refractive index difference $\Delta_{eff}$ between effective refractive indexes of the core of the certain type and the core of the other type preferably satisfy the following expression (4).

$$\Delta_{eff}(\%) > \frac{50(300 + D)D}{(150 + D)^2} \quad (4)$$

In the multi-core fiber according to the present invention, when, in all pairs of cores of different types with the core spacings shorter than $D_{min}$, the bending radius R is 100 mm, the relative refractive index difference $\Delta_{eff}$ between effective refractive indexes of the core of the certain type and the core of the other type preferably satisfy the following expression (5).

$$\Delta_{eff}(\%) > \frac{50(200 + D)D}{(100 + D)^2} \quad (5)$$

Furthermore, in the multi-core fiber according to the present invention, at least a part of the multi-core fiber is bent at a radius R of not greater than 200 mm, and under the condition that a difference of equivalent refractive index of effective refractive index between cores of the different types falls within the range that causes a problem with crosstalk when, in all pairs of cores of different types with the core spacings shorter than $D_{min}$, the core spacing in a cross-section of the multi-core fiber orthogonal to the predetermined axis is defined as D, the relative refractive index difference $\Delta_{eff}$ between effective refractive indexes of the core of a certain type and the core of the other type may satisfy the following expression (6).

$$\Delta_{eff}(\%) \geq \frac{50(400 + D)D}{(200 + D)^2} + 0.005 \quad (6)$$

In the multi-core fiber according to the present invention, when, in all pairs of cores of different types with the core spacings shorter than $D_{min}$, the bending radius R is 150 mm, the relative refractive index difference $\Delta_{eff}$ between effective refractive indexes of the core of the certain type and the core of the other type preferably satisfy the following expression (7).

$$\Delta_{eff}(\%) \geq \frac{50(300 + D)D}{(150 + D)^2} + 0.005 \quad (7)$$

In the multi-core fiber according to the present invention, when, in all pairs of cores of different types with the core spacings shorter than $D_{min}$, the bending radius R is 100 mm, the relative refractive index difference $\Delta_{eff}$ between effective refractive indexes of the core of the certain type and the core of the other type preferably satisfy the following expression (8).

$$\Delta_{eff}(\%) \geq \frac{50(200 + D)D}{(100 + D)^2} + 0.005 \quad (8)$$

In the multi-core fiber according to the present invention, it is preferable that, in the cladding region, the plurality of cores is added with a twist. For example, the condition that the cores are added with a twist means a condition that a twist is given in an optical fiber drawing or is additionally given after an optical fiber drawing, namely a condition that the plurality of cores are twisted in a circumferential direction with respect to the center axis of fiber. Both of the twist in a specific direction and the twist whose directions are inverted are acceptable. By this, the refractive index of a specific core does not intensively increase even when the multi-core fiber is bent, and then the refractive index increasing can spread. As a result, the effect of cross talk is relieved, it is not necessary to provide a difference of refractive index between cores beyond necessity.

In the multi-core fiber according to the present invention, among the cores of different types, in order to increase a relative refractive index difference between effective refractive indexes without giving a large effect to optical characteristics, various configurations can be considered.

For example, the relative refractive index difference $\Delta_{eff}$ between the effective refractive indexes of cores of different types is given by giving a difference between the refractive index of a peripheral region around the core of the certain type and the refractive index of a peripheral region around the core of the other type (first configuration). By configuring a plurality of types of cores by 2 or 3 types of cores of a step index core, a W-shaped core, and a duplex core, the above-described relative refractive index difference $\Delta_{eff}$ between the actual refractive indexes is given between cores of different types (second configuration). The first and second configurations may be adopted concurrently.

The multi-core fiber having the first and/or second configuration may have, in order to realize a smaller crosstalk, trenches around each of the cores surrounded integrally by a cladding region.

DESCRIPTION OF THE PREFERRED EMBODIMENTS

Figure 1:
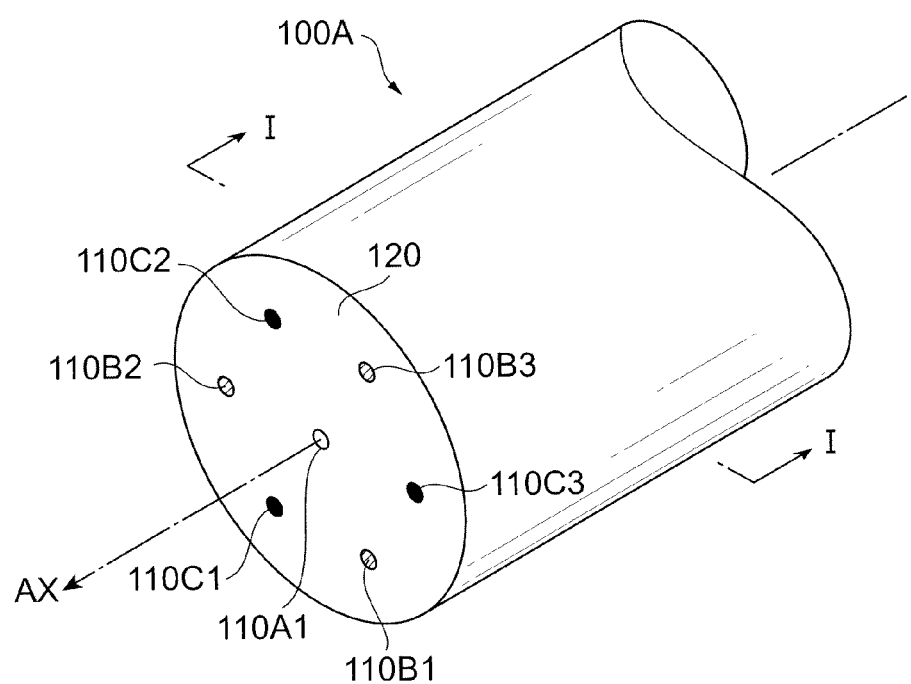
FIG. 1 is a perspective view showing a structure of an embodiment of a multi-core fiber according to the present invention.

In the following, embodiments of the multi-core fiber according to the present invention will be explained in detail with reference to FIGS. 1 to 2, and 3A to 9C. In the description of the drawings, identical or corresponding components are designated by the same reference numerals, and overlapping description is omitted.

Figure 2:
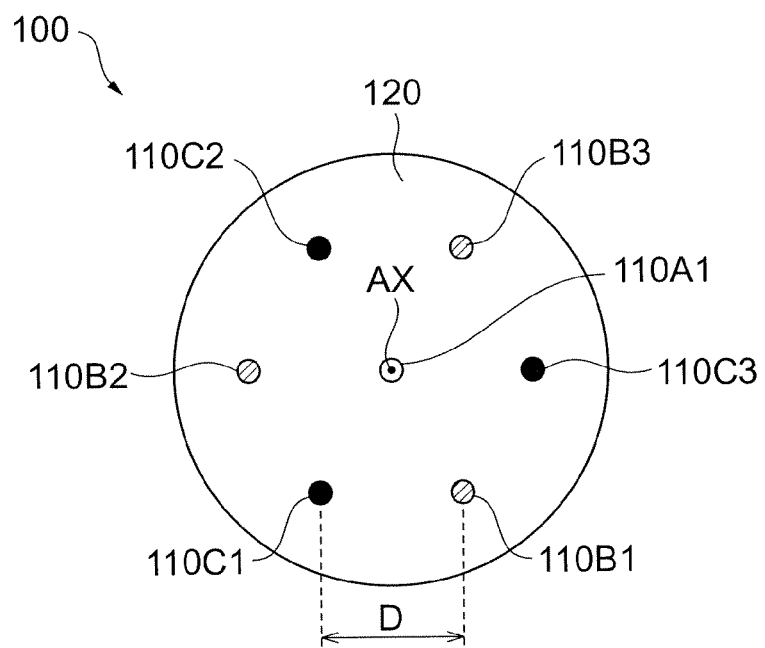
FIG. 2 is a view showing a sectional structure along the I-I line of the multi-core fiber shown in FIG. 1.

First, FIG. 1 is a perspective view showing a structure of an embodiment of the multi-core fiber according to the present invention. FIG. 2 is a view showing a sectional structure along the I-I line of the multi-core fiber shown in FIG. 1.

As shown in FIG. 1, the multi-core fiber 100A according to the present embodiment comprises seven cores 110A1, 110B1 to 110B3, and 110C1 to 110C3 which respectively extend along a predetermined axis AX and are classified into three types, and a cladding region 120 which surrounds integrally these seven cores. In the multi-core fiber 100A according to the present embodiment, as a core arrangement, the core 110A1 is disposed at the center, and around this core 110A1, the cores 110B1 to 110B3 of another type and the cores 110C1 to 110C3 of yet another type are disposed alternately so that the core spacing between the cores adjacent to each other becomes D.

The core arrangement in the multi-core fiber according to the present invention is not limited to the above-described arrangement. For example, like the multi-core fiber 100B according to another embodiment shown in FIG. 3A, it is also possible that the total number of cores is 19, and the respective cores classified into three types, that is, the cores 110An (n=1 to 7), the cores 110Bn (n=1 to 6), and the cores 110Cn (n=1 to 6) are arranged. Also, like the multi-core fiber 100C according to another embodiment shown in FIG. 3B, it is also possible that the total number of cores is 6, and the respective cores classified into two types, that is, the cores 110An (n=1 to 3) and the cores 110Cn (n=1 to 3) are arranged. Moreover, like the multi-core fiber 100D according to another embodiment shown in FIG. 3C, it is also possible that the total number of cores is 12, and the respective cores classified into two types, that is, the cores 110An (n=1 to 6) and the cores 110Cn (n=1 to 6) are arranged.

Next, a method for setting an effective refractive index of each core in the multi-core fiber according to the present invention will be described.

A power transfer ratio F between two cores is expressed by the following expression (9):

$$F = \frac{1}{1+\left(\frac{\psi}{\kappa}\right)^2} \qquad (9)$$

$$\psi = (\beta_1 - \beta_2)/2$$

In the expression, $\kappa$ is a core-core coupling coefficient, and $\beta_n$ is a propagation constant of core n.

The coupling length L (distance at which, when light is made incident on one core, the power of the other core becomes maximum) is expressed by the following expression (10):

$$L = \frac{\pi}{2\sqrt{\kappa^2 + \psi^2}} \qquad (10)$$

Here, in accordance with Document 1 described above, by reducing F or increasing L, the crosstalk can be reduced, however, in a multi-core fiber having a cladding diameter of 125 μm and adopting general cores with a core Δ of 0.4%, it is difficult to set a large number of cores in a cladding while F is left high and only L is made sufficiently long.

Therefore, it is necessary to make F smaller. In order to obtain a smaller F, ϕ must be increased, that is, a propagation constant difference between cores, in other words, a difference in effective refractive index between cores must be increased. In Document 1 described above, consideration is made about this with simulation. In accordance with the consideration, when the core spacing D between cores adjacent to each other is not less than 30 μm and the core Δ difference between these adjacent cores is 0.005%, crosstalk can be sufficiently reduced. Therefore, Document 1 described above proposes a multi-core fiber of seven cores which belong to any one of three types with core Δ of 0.38%, 0.39%, and 0.40%, respectively and are arranged so that the core spacing D between cores adjacent to each other becomes 40 μm.

However, in the consideration of Document 1 described above, bending of the multi-core fiber is not considered. Therefore, in a large number of cases, depending on a bent state of the multi-core fiber, crosstalk becomes extremely great in actuality.

When the multi-core fiber is bent, the bending diameter of each core is slightly different according to the position in the multi-core fiber. Therefore, the optical path length of each core also becomes different. When considering the multi-core fiber thus bent as a linear waveguide, as a refractive index based on the optical path length difference, an equivalent refractive index must be used. The equivalent refractive index can be obtained by multiplying an actual refractive index by $(1+x/R)$ as described in Document 2 described above. R is a bending radius of a core as a reference (reference core), and x is a position in a bending radial direction from the reference core (see FIG. 4A). Any core can be set as a reference core. When $n_0(x)$ is an actual refractive index of the bent multi-core fiber, and $n_1(x)$ is an equivalent refractive index converted in terms of a linear waveguide, an equivalent relative refractive index difference $\Delta_{eq}$ which is a relative refractive index difference between the actual refractive index and the equivalent refractive index is expressed by the following expression (11) using the parameter x and the parameter R:

$$\Delta_{eq} = \frac{n_1^2(x) - n_0^2(x)}{2n_1^2(x)} = \frac{n_0^2(x)\left(1+\frac{x}{R}\right)^2 - n_0^2(x)}{2n_0^2(x)\left(1+\frac{x}{R}\right)^2} = \frac{\left(1+\frac{x}{R}\right)^2 - 1}{2\left(1+\frac{x}{R}\right)^2} = \frac{2\frac{x}{R}+\left(\frac{x}{R}\right)^2}{2\left(1+\frac{x}{R}\right)^2} \tag{11}$$

Figures 4A, 4B:
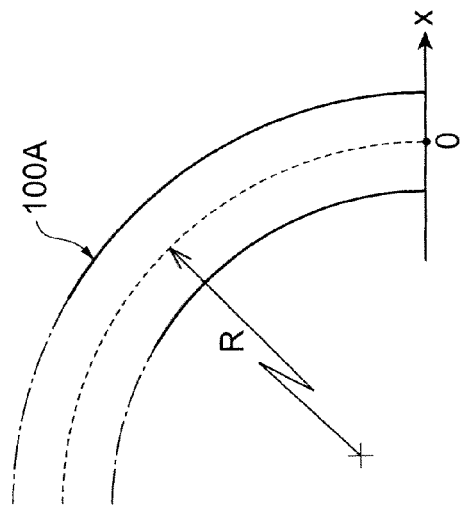
FIG. 4A is a view for describing parameters relating to bending.
FIG. 4B is a table showing an equivalent relative refractive index difference $\Delta_{eq}$ as a relative refractive index difference between an actual refractive index and an equivalent refractive index when parameters x and R relating to bending change.
Figure 5A:
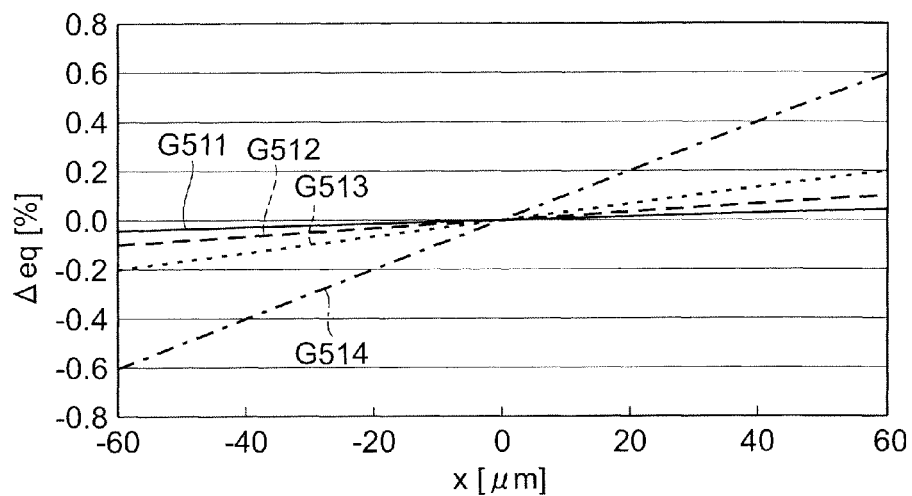
FIGS. 5A and 5B are diagrams showing the relationship between the parameter x in the table shown in FIG. 4B and the relative refractive index difference $\Delta_{eq}$, and the relationship between the parameter (1/R) and the equivalent relative refractive index difference $\Delta_{eq}$.
Figure 5B:
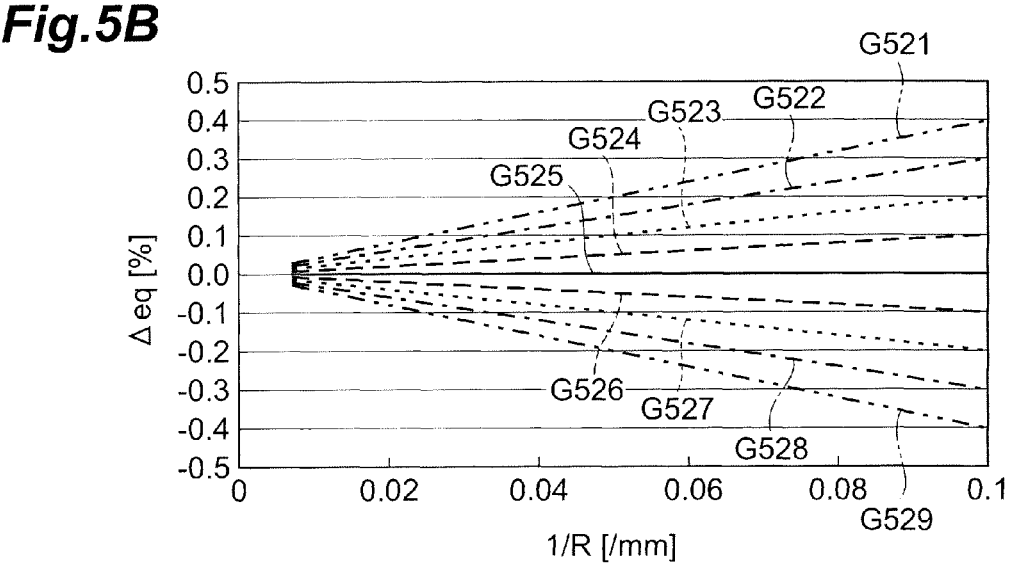

FIG. 4B is a table showing an equivalent relative refractive index difference $\Delta_{eq}$ derived from the above-described expression (5) when the parameters x and R relating to bending are changed. In the description given below, the central core 110A1 shown in FIGS. 1 and 2 is regarded as a reference core unless otherwise stated. FIG. 5A shows the relationship between the parameter x and the equivalent relative refractive index difference $\Delta_{eq}$ in the table of FIG. 4B, and FIG. 5B shows the relationship between the parameter (1/R) and the equivalent relative refractive index difference $\Delta_{eq}$.

In FIG. 5A, the graph G511 shows the relationship between the parameter x and $\Delta_{eq}$ when R=140 mm, the graph G512 shows the relationship between the parameter x and $\Delta_{eq}$ when R=60 mm, the graph G513 shows the relationship between the parameter x and $\Delta_{eq}$ when R=30 mm, and the graph G514 shows the relationship between the parameter x and $\Delta_{eq}$ when R=10 mm. In FIG. 5B, the graph G521 shows the relationship between the parameter (1/R) and $\Delta_{eq}$ when the parameter x=40 μm, the graph G522 shows the relationship between the parameter (1/R) and $\Delta_{eq}$ when the parameter x=30 μM, the graph G523 shows the relationship between the parameter (1/R) and $\Delta_{eq}$ when the parameter x=20 μm, the graph G524 shows the relationship between the parameter (1/R) and $\Delta_{eq}$ when the parameter x=10 μM, the graph G525 shows the relationship between the parameter (1/R) and $\Delta_{eq}$ when the parameter x=0 μm, the graph G526 shows the relationship between the parameter (1/R) and $\Delta_{eq}$ when the parameter x=−10 μm, the graph G527 shows the relationship between the parameter (1/R) and $\Delta_{eq}$ when the parameter x=−20 μm, the graph G528 shows the relationship between the parameter (1/R) and $\Delta_{eq}$ when the parameter x=−30 μm, and the graph G529 shows the relationship between the parameter (1/R) and $\Delta_{eq}$ when the parameter x=−40 μm.

Here, when the parameter x=40 μm, $\Delta_{eq}$ exceeds ±0.02% even when the parameter R=140 mm. In the multi-core fiber of seven cores which belong to three types of cores with relative refractive index differences $\Delta$ of 0.38%, 0.39%, and 0.40% and are arranged so that the core spacing D between cores adjacent to each other becomes 40 μm proposed in Document 1 described above, the core $\Delta$ difference between cores of different types is 0.01%, so that the relative refractive index difference $\Delta_{eff}$ between effective refractive indexes is 0.01% or less. This shows that, in the multi-core fiber of Document 1 described above, $\Delta_{eq}$ reverses to $\Delta_{eff}$ by only applying bending of the parameter R=140 mm. Specifically, in the multi-core fiber of Document 1 described above, even by slight bending, the absolute value of the relative refractive index difference between equivalent refractive indexes of effective refractive indexes of cores of different types is caused to become very small, so that it could be that crosstalk between each core increases.

Figure 6A:
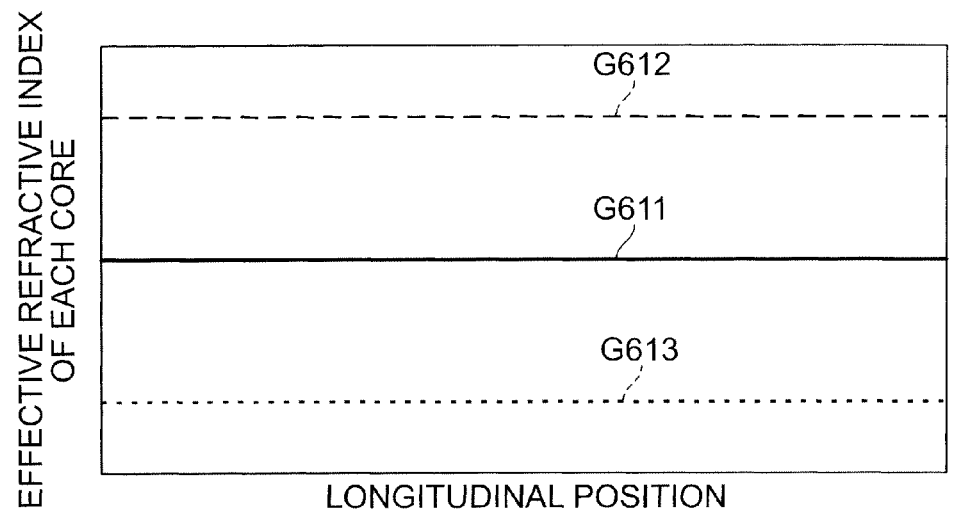
FIGS. 6A and 6B are diagrams showing the effective refractive index of each core in the multi-core fiber when being bent and equivalent refractive indexes of the effective refractive indexes.
Figure 6B:
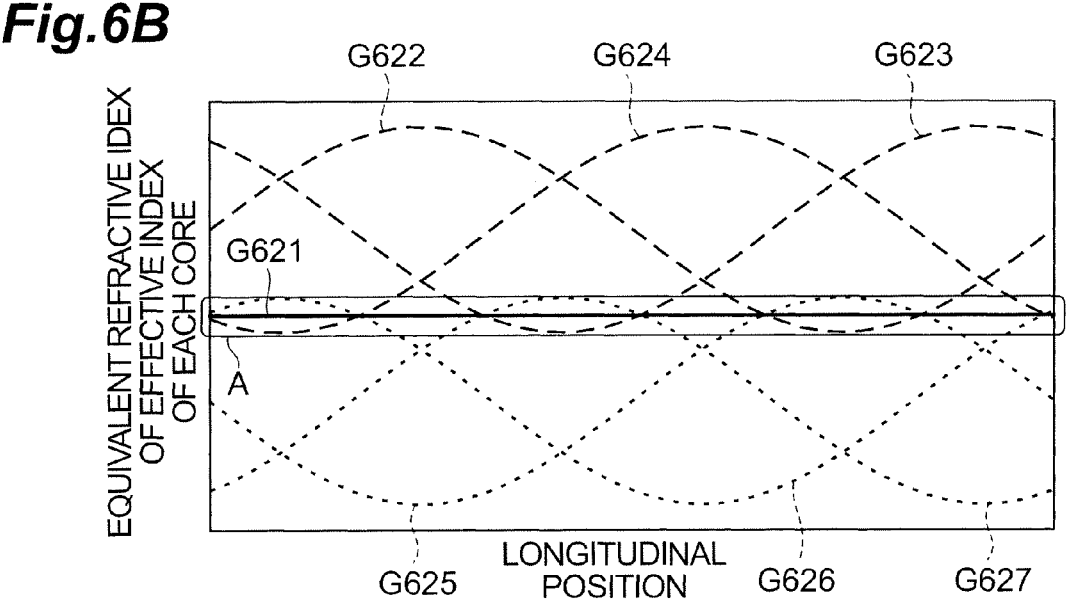

Considering a case where the multi-core fiber is wound around a bobbin, the multi-core fiber inevitably rotates due to variation in production and winding variation, so that the core arrangement rotates longitudinally. In this case, although the core spacing D between the reference core and each core is constant in the longitudinal direction, the parameter x fluctuates in the range of the core spacing D according to the position along the longitudinal direction of the multi-core fiber, and points at which the difference in equivalent relative refractive index between effective refractive indexes of cores of different types becomes smaller are distributed along the longitudinal direction of the multi-core fiber. Such a state is shown in FIGS. 6A and 6B. FIG. 6B shows fluctuation of the equivalent refractive index in a setting in which the core positions in the circumferential direction are rotated with a constant period in the longitudinal direction in a state where the multi-core fiber is bent uniformly in the longitudinal direction and the core positions in the optical fiber are arranged at even spacings in the circumferential direction in an optical fiber section.

FIGS. 6A and 6B are diagrams showing the effective refractive index of each core in the multi-core fiber when it is bent and equivalent refractive indexes of the effective refractive indexes, showing examples of effective refractive indexes converted into equivalent refractive indexes in a case where the multi-core fiber is bent as in the state where it is wound around a bobbin. In particular, FIGS. 6A and 6B show the effective refractive index of each core in the multi-core fiber 100A shown in FIGS. 1 and 2 and equivalent refractive indexes of the effective refractive indexes. FIG. 6A shows the relationships between longitudinal positions in the multi-core fiber and the effective refractive index of each core, and the graph G611 shows the effective refractive index of the central core (reference core) 110A1 positioned on the optical axis AX of the multi-core fiber 100A, the graph G612 shows the effective refractive index of cores 110B1 to 110B3 of another type positioned around the reference core 110A1, and the graph G613 shows an effective refractive index of the cores 110C1 to 110C3 of yet another type positioned around the reference core 110A1, respectively. FIG. 6B shows longitudinal positions in the multi-core fiber and equivalent refractive indexes of effective refractive index of each core, and the graph G621 shows the equivalent refractive index of the effective refractive index of the reference core 110A1, the graph G622 shows the equivalent refractive index of the effective refractive index of the core 110B1 of another type positioned around the reference core 110A1, the graph G623 shows the equivalent refractive index of the effective refractive index of the core 110B2 of another type positioned around the reference core 110A1, the graph G624 shows the equivalent refractive index of the effective refractive index of the core 110B3 of another type positioned around the reference core 110A1, the graph G625 shows the equivalent refractive index of the effective refractive index of the core 110C1 of yet another type positioned around the reference core 110A1, the graph G626 shows the equivalent refractive index of the effective refractive index of the core 110C2 of yet another type positioned around the reference core 110A1, and the graph G627 shows the equivalent refractive index of the effective refractive index of the core 110C3 of yet another type positioned around the reference core 110A1. The region A in FIG. 6A shows a case that there is a problem with crosstalk of the core of a different type to the central core 110A1. The equivalent refractive indexes of effective refractive indexes of the core intersect in the region A. In concrete terms, the graphs G622, G623 and G624 intersect to the graph G621 respectively, and the graphs G625, G626 and G627 intersect to the graph G621 respectively. It can be understood that it is necessary to avoid an intersection problem (crosstalk problem) by setting the effective refractive indexes of the graphs G612 and G613 to a refractive index further far from the graph G621.

In a multi-core fiber constituted by a plurality of types of cores, a plurality of cores of the same type may exist. In the multi-core fiber, the cores of the same type are arranged at sufficient core spacings D so that crosstalk between these becomes small. Therefore, when the shortest core spacing between the cores of the same type is defined as $D_{min}$, when the core spacing D between cores of different types is not shorter than $D_{min}$, it is not necessary to consider the relative refractive index difference between effective refractive indexes of these cores (crosstalk is sufficiently small even between cores of the same type which have effective refractive indexes equal to each other). However, all pairs of cores of different types at core spacings D less than $D_{min}$ must satisfy at least the following expression (12). This is necessary because the equivalent refractive indexes of effective refractive indexes of a pair of cores of different types with the core spacing D shorter than $D_{min}$ from becoming equal to each other. Accordingly, even when bending of a bending radius R or more is applied, crosstalk between cores can be suppressed to be small.

$$\Delta_{eff}(\%) > 100\Delta_{eq} = \frac{2\frac{D}{R} + \left(\frac{D}{R}\right)^2}{2\left(1 + \frac{D}{R}\right)^2} \cdot 100 \quad (12)$$

Based on the consideration described above, when the position x in a bending radial direction from the reference core which was considered as a position in a bending radial direction of each core from the central core as a reference core is replaced with a position in a bending radial direction between cores of different types, in all pairs of cores of different types with the core spacing shorter than $D_{min}$, a relative refractive index difference $\Delta_{eff}$ between an actual effective refractive index of a core of a certain type (actual effective refractive index not converted into an equivalent refractive index) and an actual effective refractive index of a core of another type must satisfy at least the condition of the following expression (13) provided that D is a core spacing between cores of different types in a section of the multi-core fiber, and an allowable bending radius is determined as R:

$$\Delta_{eff} \geq \Delta_{eq} + \alpha = \frac{2\frac{D}{R} + \left(\frac{D}{R}\right)^2}{2\left(1 + \frac{D}{R}\right)^2} + \alpha \quad (13)$$

Figure 7A:
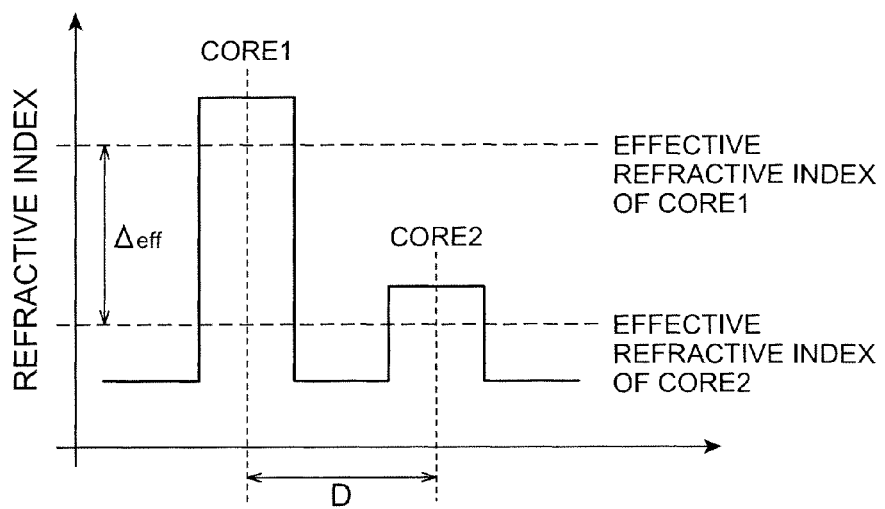
FIGS. 7A and 7B are a refractive index profile and an equivalent refractive index profile of two cores (core 1 and core 2 with different effective refractive indexes) in the multi-core fiber when being bent.
Figure 7B:
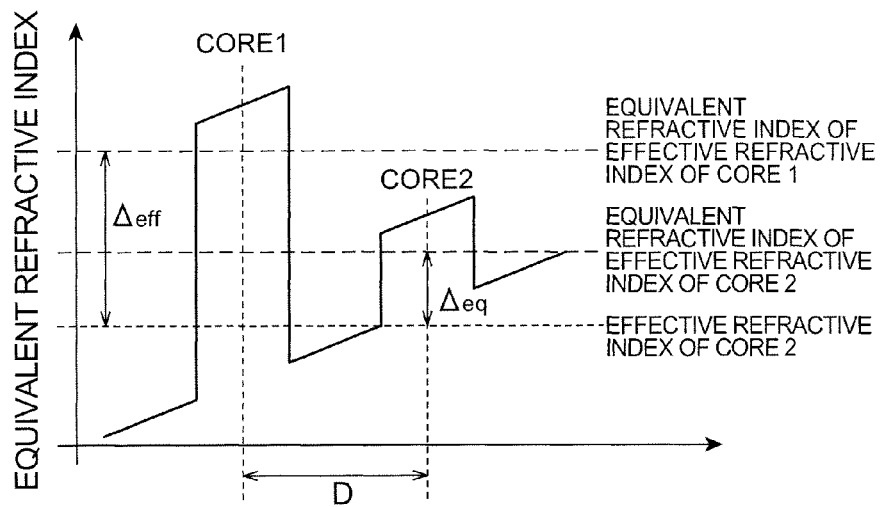

$\alpha$ in the expression (13) is a relative refractive index difference between effective refractive indexes of cores of different types in the case where sufficiently small crosstalk can be realized by the multi-core fiber designed without considering bending. In the expression (13), a relative refractive index difference of a higher effective refractive index from a lower effective refractive index is used so that $\Delta_{eff} > 0$, and the reference core is set so that $\Delta_{eq} > 0$. FIGS. 7A and 7B are a refractive index profile and an equivalent refractive index profile of two cores (core 1 and core 2 with different effective refractive indexes) in the multi-core fiber when it is bent. When bending is not considered, the case of FIG. 7A is applied, and satisfying $\Delta_{eff} \geq \alpha$ is considered as sufficient. However, considering bending, the equivalent refractive index of FIG. 7B must be considered. In this case, it is necessary to satisfy $\Delta_{eff} - \Delta_{eq} \geq \alpha$, that is, $\Delta_{eff} \geq \Delta_{eq} + \alpha$.

In accordance with Document 1 described above, when the core spacing D=30 μm between cores adjacent to each other, as the core Δ difference, 0.005% is sufficient, so that as the parameter α, 0.005% is also sufficient, and the relative refractive index difference $\Delta_{eff}$ is required to only satisfy the following expression (14) expressed in percentage. Accordingly, even when bending with a bending radius R or more is applied, crosstalk between the cores can be suppressed to be small.

$$\Delta_{eff}(\%) \geq \frac{2\frac{D}{R} + \left(\frac{D}{R}\right)^2}{2\left(1 + \frac{D}{R}\right)^2} \cdot 100 + 0.005 \quad (14)$$

The multi-core fiber according to the present embodiment is preferably wound around a bobbin with a body radius of R. In this case, if the multi-core fiber is wound in shipping, a client buying it can verify whether there is a problem with crosstalk and characteristics of each core or not while the multi-core finer is wound around the bobbin.

In the multi-core fiber according to the present embodiment, the body radius R of the bobbin preferably fall within the range of 200 mm to 30 mm. Since crosstalk due to the equivalent refractive index $\Delta_{eq}$ becomes pronounced in the condition that the body radius R of the bobbin is 200 mm or less, the multi-core fiber according to the present invention is effective. On the other hand, in the condition that the body radius R of the bobbin is 30 mm or less, design and fabrication for the multi-core fiber itself become difficult. The body radius R of the bobbin may fall within the range of 150 mm to 30 mm. The body radius R of the bobbin may fall within the range of 100 mm to 30 mm. More specifically, it is preferable that the body radius R of the bobbin is one of 76 mm, 85 mm, 115 mm, and 140 mm.

More specifically, in the multi-core fiber according to the present embodiment, at least a part of the multi-core fiber is bent at a radius R of not greater than 200 mm, and when, in all pairs of cores of different types with the core spacings shorter than $D_{min}$, the core spacing in a cross-section of the multi-core fiber orthogonal to the predetermined axis is defined as D, the relative refractive index difference $\Delta_{eff}$ between effective refractive indexes of the core of a certain type and the core of the other type preferably satisfy the following expression (15). In the following, the parameter D in each expression is, similar to the parameter R, expressed in unit of millimeters.

$$\Delta_{eff}(\%) > \frac{50(400+D)D}{(200+D)^2} \quad (15)$$

In the multi-core fiber according to the present embodiment, when, in all pairs of cores of different types with the core spacings shorter than $D_{min}$, the bending radius R is 150 mm, the relative refractive index difference $\Delta_{eff}$ between effective refractive indexes of the core of the certain type and the core of the other type preferably satisfy the following expression (16).

$$\Delta_{eff}(\%) > \frac{50(300+D)D}{(150+D)^2} \quad (16)$$

In the multi-core fiber according to the present embodiment, when, in all pairs of cores of different types with the core spacings shorter than $D_{min}$, the bending radius R is 100 mm, the relative refractive index difference $\Delta_{eff}$ between effective refractive indexes of the core of the certain type and the core of the other type preferably satisfy the following expression (17).

$$\Delta_{eff}(\%) > \frac{50(200+D)D}{(100+D)^2} \quad (17)$$

Furthermore, in the multi-core fiber according to the present embodiment, at least a part of the multi-core fiber is bent at a radius R of not greater than 200 mm, and under the condition that a difference of equivalent refractive index of effective refractive index between cores of the different types falls within the range that causes a problem with crosstalk when, in all pairs of cores of different types with the core spacings shorter than $D_{min}$, the core spacing in a cross-section of the multi-core fiber orthogonal to the predetermined axis is defined as D, the relative refractive index difference $\Delta_{eff}$ between effective refractive indexes of the core of a certain type and the core of the other type may satisfy the following expression (18).

$$\Delta_{eff}(\%) \geq \frac{50(400+D)D}{(200+D)^2} + 0.005 \quad (18)$$

In the multi-core fiber according to the present embodiment, when, in all pairs of cores of different types with the core spacings shorter than $D_{min}$, the bending radius R is 150 mm, the relative refractive index difference $\Delta_{eff}$ between effective refractive indexes of the core of the certain type and the core of the other type preferably satisfy the following expression (19).

$$\Delta_{eff}(\%) \geq \frac{50(300+D)D}{(150+D)^2} + 0.005 \quad (19)$$

In the multi-core fiber according to the present embodiment, when, in all pairs of cores of different types with the core spacings shorter than $D_{min}$, the bending radius R is 100 mm, the relative refractive index difference $\Delta_{eff}$ between effective refractive indexes of the core of the certain type and the core of the other type preferably satisfy the following expression (20).

$$\Delta_{eff}(\%) \geq \frac{50(200+D)D}{(100+D)^2} + 0.005 \quad (20)$$

In order to satisfy the above-described expression (14), the relative refractive index difference between the effective refractive indexes of cores of different types must be very large. For example, when the parameter R=30 mm is allowed, the relative refractive index difference $\Delta_{eff}$ between effective refractive indexes of cores at a core spacing D=30 µm must be 0.105% or more. When the core spacing D=40 µm, $\Delta_{eff} \geq 0.138\%$ must be satisfied. When such a condition is realized by using only the core $\Delta$ and the core diameter difference, various optical characteristics such as the mode field diameters (MFD) of each core are greatly influenced.

Figure 8A:
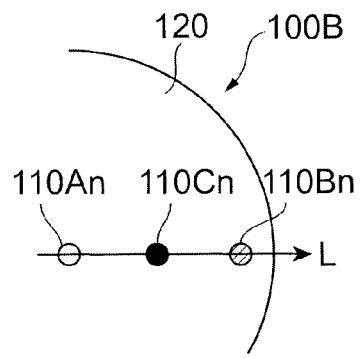
FIGS. 8A to 8C are diagrams for describing a structure (1) for giving a difference in effective refractive index between cores of different types.
Figure 8B:
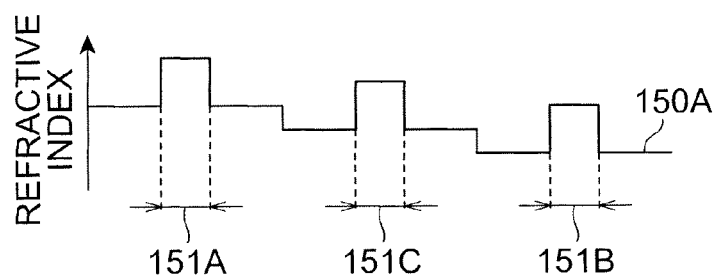
Figure 8C:
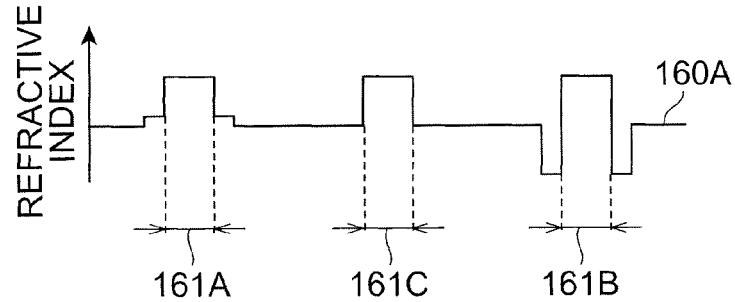

Therefore, in the multi-core fiber according to the present embodiment, it is preferable that a large relative refractive index difference between effective refractive indexes of cores of different types is realized by adopting the following structure. In detail, the large relative refractive index difference can be realized by adopting the refractive index profiles shown in FIGS. 8B and 8C as a refractive index profile of the multi-core fiber according to the present invention. FIGS. 8B and 8C show refractive index profiles along the line L of the multi-core fiber 100B having the sectional structure shown in FIG. 8A. The sectional structure of FIG. 8A is substantially equal to the sectional structure of the multi-core fiber 100B according to another embodiment shown in FIG. 3A. In the drawings, three types of cores are on a straight line in the radial direction, however, they may not be on a straight line as long as their distances and positions in the radial direction are different. Further, cores of a plurality of types as shown in the drawings may be on the same circumference at the same radial distance.

Namely, the refractive index profile 150A shown in FIG. 8B shows refractive indexes of each portion along the line L in FIG. 8A, and the region 151A shows the refractive index of the core 110An (n=1 to 7), the region 151C shows the refractive index of the core 110Cn (n=1 to 6), and the region 151E shows the refractive index of the core 110Bn (n=1 to 6). In the refractive index profile 150A, the adjustment for the core diameters and cores $\Delta$ is limited to the ranges not having great influences on the optical characteristics, and a large $\Delta_{eff}$ is realized by providing a step in the refractive index of the cladding region 120 positioned between cores of different types.

The refractive index profile 160A shown in FIG. 8C shows refractive indexes of each portion along the line L in FIG. 8A, and the region 161A shows the refractive index of the core 110An (n=1 to 7), the region 161C shows the refractive index of the core 110Cn (n=1 to 6) and the region 161B shows the refractive index of the core 110Bn (n=1 to 6). Such a refractive index profile 160A is realized by setting the core 110An (n=1 to 7) as an inner core of a duplex core, setting the core 110Cn (n=1 to 6) as a step index core, and setting the core 110Bn (n=1 to 6) as a W-shaped core. At least two or more types of core structures are employed among these three types of cores. By such a refractive index profile 160A, a large $\Delta_{eff}$ can be also realized. The core 110An, the core 110Bn, and the core 110Cn are not limited to the above-described core structures, and may be any of the duplex core, the W-shaped core, and the step index core, respectively.

However, in the case of the refractive index profile 150A shown in FIG. 8B, the bending loss may increase because light easily leaks from a core with a low cladding refractive index to a core with a high cladding refractive index. Therefore, as shown in FIGS. 9A to 9C, trenches may be added around some cores or all cores.

Figure 3A:
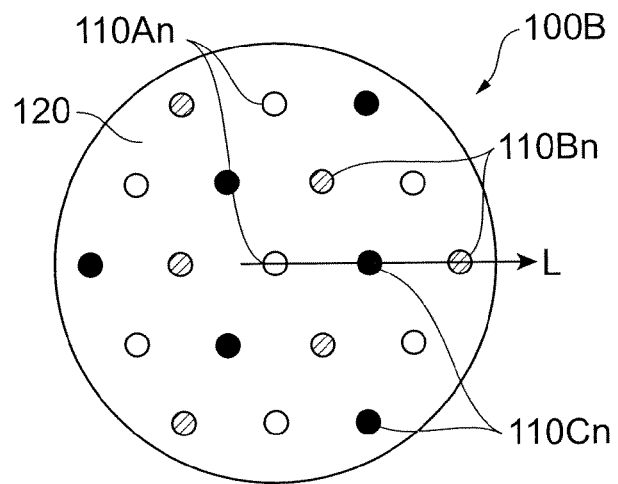
FIGS. 3A to 3C are views showing sectional structures of other embodiments of the multi-core fiber according to the present invention.
Figure 3B:
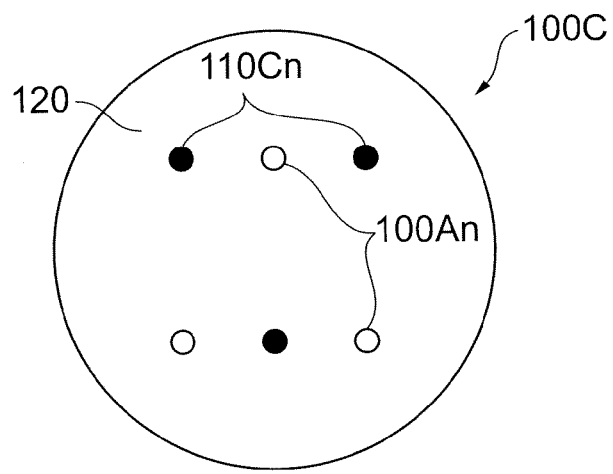
Figure 3C:
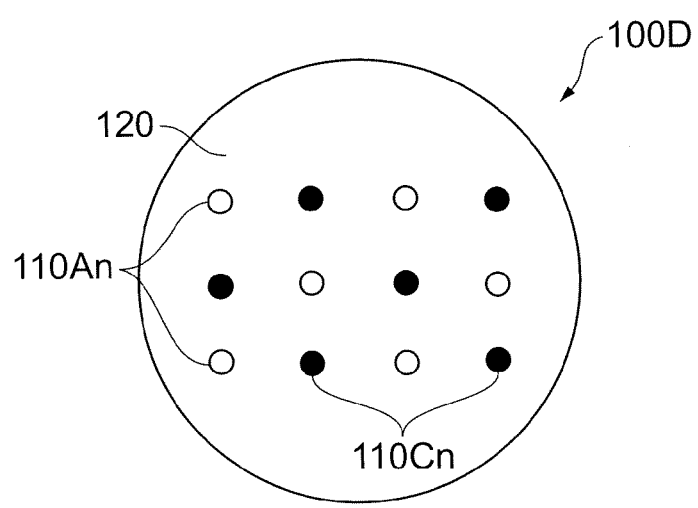
Figure 9A:
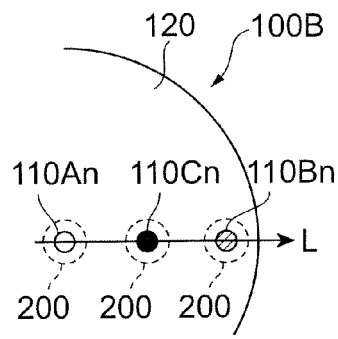
FIGS. 9A to 9C are diagrams for describing a structure (2) for giving a difference in effective refractive index between cores of different types.

FIG. 9A shows a partial sectional structure of a multi-core fiber matching the multi-core fiber 110B of FIG. 3A similar to FIG. 8A, however, it is different from the sectional structure shown in FIG. 8A in that trenches 200 are provided around each core.

Figure 9B:
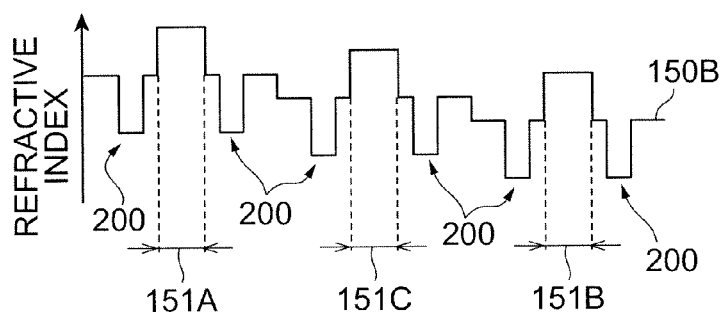
Figure 9C:
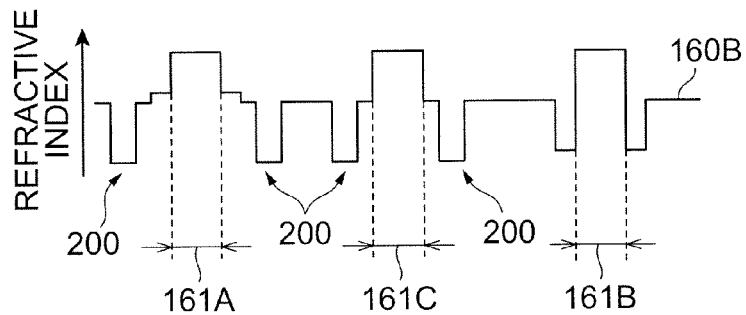

Similarly, the refractive index profile 150B shown in FIG. 9B is also different from the refractive index profile 150A (see FIG. 8B) in that trenches 200 are provided around each core. The refractive index profile 160B shown in FIG. 9C is also different from the refractive index profile 160A shown in FIG. 8C in that trenches 200 are provided around each core. In the refractive index profile 160B, the core 110An (n=1 to 7) is a W-shaped core, so that around this core 110An (n=1 to 7), no trench is formed.

As described above, in accordance with the present invention, in all pairs of cores of different types with the core spacings shorter than $D_{min}$ included in the multi-core fiber, a relative refractive index difference $\Delta_{eff}$ between an effective refractive index of a core of a certain type of the pair and an effective refractive index of a core of another type is given as a sufficient difference, so that crosstalk increase between each core in the case of bending within an allowable range can be effectively suppressed.

What is claimed is:

1. A multi-core fiber comprising: a plurality of types of cores respectively having different effective refractive indexes in design and extending along a predetermined axis; and a cladding region integrally surrounding the plurality of types of cores, the cores being arranged such that a minimum core spacing $D_{min}$ between the same type of cores, servicing as a center-to-center spacing, becomes not shorter than the minimum spacing that causes no problem with crosstalk, wherein the multi-core fiber has at least a pair of cores of different types with a core spacing shorter than $D_{min}$, and wherein when, in all pairs of cores of different types with the core spacings shorter than $D_{min}$, the core spacing and a bending radius in a cross-section of the multi-core fiber orthogonal to the predetermined axis are respectively defined as D and R, a relative refractive index difference $\Delta_{eff}$ between effective refractive indexes of the core of a certain type and the core of the other type satisfies the following condition:

$$\Delta_{eff} (\%) > \frac{2\frac{D}{R} + \left(\frac{D}{R}\right)^2}{2\left(1+\frac{D}{R}\right)^2} \cdot 100.$$

2. A multi-core fiber according to claim 1, wherein, when a difference of equivalent refractive index of effective refractive index between cores of the different types falls within a range that causes a problem with crosstalk, the relative refractive index difference $\Delta_{eff}$ between effective refractive indexes of the core of the certain type and the core of the other type satisfies the following condition $$\Delta_{eff} (\%) \geq \frac{2\frac{D}{R} + \left(\frac{D}{R}\right)^2}{2\left(1+\frac{D}{R}\right)^2} \cdot 100 + 0.005.$$

3. A multi-core fiber according to claim 1, wherein the multi-core fiber is wound around a bobbin with a body radius of R.

4. A multi-core fiber according to claim 3, wherein the body radius R of the bobbin falls within the range of 200 mm to 30 mm.

5. A multi-core fiber according to claim 3, wherein the body radius R of the bobbin falls within the range of 150 mm to 30 mm.

6. A multi-core fiber according to claim 3, wherein the body radius R of the bobbin falls within the range of 100 mm to 30 mm.

7. A multi-core fiber according to claim 3, wherein the body radius R of the bobbin is one of 76 mm, 85 mm, 115 mm, and 140 mm.

8. A multi-core fiber comprising: a plurality of types of cores respectively having different effective refractive indexes in design and extending along a predetermined axis; and a cladding region integrally surrounding the plurality of types of cores, the cores being arranged such that a minimum core spacing $D_{min}$ between the same type of cores, servicing as a center-to-center spacing, becomes not shorter than the minimum spacing that causes no problem with crosstalk, wherein the multi-core fiber has at least a pair of cores of different types with a core spacing shorter than $D_{min}$, and wherein at least a part of the multi-core fiber is bent at a radius R of not greater than 200 mm, and when, in all pairs of cores of different types with the core spacings of shorter than $D_{min}$, the core spacing in a cross-section of the multi-core fiber orthogonal to the predetermined axis is defined as D, a relative refractive index difference $\Delta_{eff}$ between effective refractive indexes of the core of a certain type and the core of the other type satisfies the following condition $$\Delta_{eff} (\%) > \frac{50(400+D)D}{(200+D)^2}.$$

9. A multi-core fiber according to claim 1, wherein when, in all pairs of cores of different types with the core spacings of shorter than $D_{min}$, the bending radius R is 150 mm, the relative refractive index difference $\Delta_{eff}$ between effective refractive indexes of the core of the certain type and the core of the other type satisfies the following condition $$\Delta_{eff} (\%) > \frac{50(300+D)D}{(150+D)^2}.$$

10. A multi-core fiber according to claim 1, wherein when, in all pairs of cores of different types with the core spacings shorter than $D_{min}$, the bending radius R is 100 mm, the relative refractive index difference $\Delta_{eff}$ between effective refractive indexes of the core of the certain type and the core of the other type satisfies the following condition $$\Delta_{e\!f\!f}(\%) > \frac{50(200+D)D}{(100+D)^2}.$$

11. A multi-core fiber comprising: a plurality of types of cores respectively having different effective refractive indexes in design and extending along a predetermined axis; and a cladding region integrally surrounding the plurality of types of cores, the cores being arranged such that a minimum core spacing $D_{min}$ between the same type of cores, servicing as a center-to-center spacing, becomes not shorter than the minimum spacing that causes no problem with crosstalk, wherein the multi-core fiber has at least a pair of cores of different types with a core spacing shorter than $D_{min}$, and wherein at least a part of the multi-core fiber is bent at a radius R of not greater than 200 mm, and when, under the condition that a difference of equivalent refractive index of effective refractive index between cores of the different types falls within the range that causes a problem with crosstalk, the core spacing in a cross-section of the multi-core fiber orthogonal to the predetermined axis is defined as D, a relative refractive index difference $\Delta_{e\!f\!f}$ between effective refractive indexes of the core of a certain type and the core of the other type, which have the core spacing shorter than $D_{min}$, satisfies the following condition $$\Delta_{e\!f\!f}(\%) \geq \frac{50(400+D)D}{(200+D)^2} + 0.005.$$

12. A multi-core fiber according to claim 11, wherein when, in all pairs of cores of different types with the core spacings shorter than that causes no problem with crosstalk, the bending radius R is 150 mm, the relative refractive index difference $\Delta_{e\!f\!f}$ between effective refractive indexes of the core of the certain type and the core of the other type satisfies the following condition $$\Delta_{e\!f\!f}(\%) \geq \frac{50(300+D)D}{(150+D)^2} + 0.005.$$

13. A multi-core fiber according to claim 11, wherein when, in all pairs of cores of different types with the core spacings shorter than that causes no problem with crosstalk, the bending radius R is 100 mm, the relative refractive index difference $\Delta_{e\!f\!f}$ between effective refractive indexes of the core of the certain type and the core of the other type satisfies the following condition $$\Delta_{e\!f\!f}(\%) \geq \frac{50(200+D)D}{(100+D)^2} + 0.005.$$

14. A multi-core fiber according to claim 1, wherein, in the cladding region, the plurality of cores are added with a twist.

15. A multi-core fiber according to claim 1, wherein, a relative refractive index difference $\Delta$ between the effective refractive indexes of cores of different types is given by giving a difference between the refractive index of a peripheral region around the core of the certain type and the refractive index of a peripheral region around the core of the other type.

16. A multi-core fiber according to claim 1, wherein a relative refractive index difference $\Delta_{e\!f\!f}$ between the effective refractive indexes of cores of different types is given by configuring the plurality of types of cores of two or three types among a step index core, a W-shaped core, and a duplex core.

17. A multi-core fiber according to claim 15, wherein a trench is added around each of the cores surrounded integrally by the cladding region.

\* \* \* \* \*